(12) United States Patent
Messina

(10) Patent No.: US 11,519,455 B2
(45) Date of Patent: Dec. 6, 2022

(54) PIVOTING CONNECTION DEVICE PROVIDING A CONNECTION BETWEEN AT LEAST TWO COMPONENTS, AIRCRAFT COMPRISING A COWL EQUIPPED WITH SAID PIVOTING CONNECTION DEVICE

(71) Applicant: Airbus Operations SAS, Toulouse (FR)

(72) Inventor: Paolo Messina, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 547 days.

(21) Appl. No.: 16/715,003

(22) Filed: Dec. 16, 2019

(65) Prior Publication Data

US 2020/0231295 A1     Jul. 23, 2020

(30) Foreign Application Priority Data

Jan. 21, 2019 (FR) ...................................... 1900503

(51) Int. Cl.
*F16C 11/04* (2006.01)
*F16B 21/12* (2006.01)
*B64D 29/06* (2006.01)

(52) U.S. Cl.
CPC ............ *F16C 11/045* (2013.01); *B64D 29/06* (2013.01); *F16B 21/12* (2013.01); *Y10T 403/32893* (2015.01)

(58) Field of Classification Search
CPC ........ B64D 29/06; F16B 21/12; F16C 11/045; F16C 2326/43; Y10T 403/32861; Y10T 403/32893; Y10T 403/32918

(Continued)

(56) References Cited

U.S. PATENT DOCUMENTS 4,943,013 A * 7/1990 Kapala .................. F16C 11/045 244/54
6,296,203 B1 * 10/2001 Manteiga ............ F16C 11/0614 60/797

(Continued)

FOREIGN PATENT DOCUMENTS

EP     0086691 A1    8/1983
ES     2390440 A1    11/2012

(Continued)

OTHER PUBLICATIONS

French Application Search Report. FR 1900503, dated Sep. 27, 2019.

*Primary Examiner* — Josh Skroupa
(74) *Attorney, Agent, or Firm* — Greer, Burns & Crain, Ltd.

(57) ABSTRACT

A pivoting connection device connects at least two components and comprises a guide ring, positioned in an orifice of a first branch of a clevis, which guide ring has a tubular body together with a flange pressing against the interior face of the first branch, a cylindrical shaft connecting the clevis and an arm, having a first end stop, configured to prevent translational movement of the cylindrical shaft in a first sense and a second end stop configured to prevent translational movement of the cylindrical shaft in a second sense, the opposite to the first sense, an immobilizing system configured to immobilize the cylindrical shaft in terms of rotation with respect to the guide ring, the guide ring comprising a first longitudinal groove or slot configured to allow the first end stop to pass.

10 Claims, 17 Drawing Sheets

(58) Field of Classification Search
USPC .................................... 403/150, 154, 157
See application file for complete search history.

(56) References Cited

U.S. PATENT DOCUMENTS

| | | | | |
|---|---|---|---|---|
| 6,698,932 | B2* | 3/2004 | Hamaguchi | ........... F16C 11/045 |
| | | | | 384/275 |
| 7,329,066 | B2* | 2/2008 | Pineiros | ................ F16C 11/045 |
| | | | | 403/154 |
| 8,282,306 | B2* | 10/2012 | Koch | ................. B62D 53/0871 |
| | | | | 403/154 |
| 8,740,136 | B2* | 6/2014 | Audart-Noel | ....... F16C 11/0614 |
| | | | | 244/54 |
| 9,593,708 | B2* | 3/2017 | Cassagne | .............. F16C 11/045 |
| 9,765,808 | B2* | 9/2017 | Ginn | ..................... F16C 11/045 |
| 10,081,435 | B2 | 9/2018 | Ciprian | |
| 2012/0128443 | A1 | 5/2012 | Fabre et al. | |
| 2019/0375015 | A1* | 12/2019 | Mabire | ................. F16C 11/045 |
| 2020/0124084 | A1* | 4/2020 | Mabire | ................. F16C 11/045 |
| 2021/0293276 | A1* | 9/2021 | Iijima | ................. F16C 11/045 |

FOREIGN PATENT DOCUMENTS

| | | |
|---|---|---|
| FR | 2596116 A1 | 9/1987 |
| FR | 2947592 A1 | 1/2011 |
| JP | S5332269 U | 3/1978 |

\* cited by examiner

Priort Art

PIVOTING CONNECTION DEVICE PROVIDING A CONNECTION BETWEEN AT LEAST TWO COMPONENTS, AIRCRAFT COMPRISING A COWL EQUIPPED WITH SAID PIVOTING CONNECTION DEVICE

CROSS-REFERENCES TO RELATED APPLICATIONS

This application claims the benefit of the French patent application No. 1900503 filed on Jan. 21, 2018, the entire disclosures of which are incorporated herein by way of reference.

FIELD OF THE INVENTION

The present application relates to a pivoting connection device providing a connection between at least two components and to an aircraft comprising a cowl equipped with said pivoting connection device.

BACKGROUND OF THE INVENTION

According to one configuration visible in FIGS. 1 and 2, an aircraft 10 comprises several engine assemblies 12 which are positioned under the wing structure 14 of the aircraft 10.

An engine assembly 12 comprises an engine 16, a nacelle 18 positioned around the engine 16, and a pylon 20 which provides the connection between the engine 16 and the rest of the aircraft 10, notably the wing structure 14.

The nacelle 18 comprises at least one cowl 22 connected to the rest of the nacelle 18 by a hinge 24 that allows the cowl 22 to pivot about a pivot axis A24 between an open position (visible in FIG. 2) and a closed position (visible in FIG. 1).

In one configuration, the hinge 24 has several pivoting connection devices 26 distributed along the pivot axis A24.

According to a first embodiment visible in FIG. 3, a pivoting connection device 26 comprises:

a clevis 28, rigidly secured to the cowl 22 (or, respectively, to the rest of the nacelle 18), having two branches 28.1, 28.2, an arm 30, rigidly secured to the rest of the nacelle 18 (or, respectively, to the cowl 22), positioned between the branches 28.1, 28.2 of the clevis 28, a cylindrical shaft 32 positioned in coaxial bores provided in the two branches 28.1, 28.2 of the clevis 28 and the arm 30, said cylindrical shaft 32 providing the connection between the clevis 28 and the arm 30 and having an axis of revolution that coincides with the pivot axis A24.

Guide rings may be interposed between the cylindrical shaft 32 and the branches 28.1, 28.2 of the clevis 28 and between the cylindrical shaft 32 and the arm 30.

The pivoting connection device 26 also comprises first and second end stops 34, 36, positioned one on each side of the branches 28.1, 28.2 of the clevis 28, in order to immobilize the cylindrical shaft 32 in terms of translational movement with respect to the branches 28.1, 28.2 in a direction parallel to the pivot axis A24.

With this first embodiment, the cylindrical shaft 32 exhibits at a first end a head 38 which forms the first end stop 34 and which is configured to bear against the exterior face F28.1 of the first branch 28.1 of the clevis 28.

The second end stop 36 takes the form of a split pin 40 which passes through the cylindrical shaft 32 and which is configured to bear against the exterior face F28.2 of the second branch 28.2 of the clevis 28.

This first embodiment requires for the two sides of the clevis 28 to be accessible in order to be able to assemble the pivoting connection device, the cylindrical shaft 32 being introduced from a first side of the clevis 28, the split pin then being fitted from a second side of the clevis 28.

According to a second embodiment described in document FR 2947592 and illustrated in FIGS. 4 to 6, a pivoting connection device comprises, in addition to the clevis 28 and to the arm 30, a connecting system comprising:

a tubular body 42 which, at a first end, has a flange 42.1 configured to bear against the exterior face F28.1 of the first branch 28.1 of the clevis 28 and, at a second end, at least one slot 42.2 allowing the second end of the tubular body 42 to expand radially, an insert 44 of frustoconical shape positioned inside the tubular body 42 at the level of the second end thereof, having a tapped bore 44.1, and a screw 46, configured to be housed in the tubular body 42 and having, at a first end, a head 46.1 configured to be pressed against the flange 42.1 of the tubular body 42 and, at a second end, a threaded portion 46.2 configured to screw into the tapped bore 44.1.

The tightening or loosening of the screw 46 causes the insert 44 and the head 46.1 of the screw 46 to be placed together or further apart. When the insert 44 and the head 46.1 of the screw 46 are in the spatially separated state, the second end of the tubular body 42 is not radially expanded. When the insert 44 and the head 46.1 of the screw 46 are in the spatially brought-together state, the second end of the tubular body 42 is radially expanded.

According to this second embodiment, with the insert 44 and the head 46.1 of the screw 46 in the spatially separated state, the connecting system is inserted into the bores of the branches 28.1, 28.2 of the clevis 28 and of the arm 30 from a first side of the clevis 28. When the connecting system has been inserted, the head 46.1 of the screw 46 and the insert 44 are brought closer together by tightening the screw 46, from the first side of the clevis 28, so as to cause the second end of the tubular body 42 to expand.

Thus, according to this second embodiment, the flange 42.1 of the tubular body 42 forms a first end stop allowing the tubular body 42 to be immobilized in a first direction. The expanding of the second end of the tubular body forms a second end stop allowing the tubular body 42 to be immobilized. Friction between the tubular body 42 and the second branch 28.2 of the clevis 28, as a result of the radial expansion of the second end of the tubular body, also contributes to immobilizing the tubular body 42 with respect to the second branch 28.2.

This second embodiment allows the pivoting connection device to be assembled from just one side of the clevis 28.

However, it is not fully satisfactory because the expanding of the second end of the tubular body 42 introduces stresses into the second branch 28.2 of the clevis 28.

The present invention seeks to overcome all or some of the disadvantages of the prior art.

SUMMARY OF THE INVENTION

To this end, one subject of the invention is a pivoting connection device connecting at least two components and comprising:

a clevis, rigidly attached to the first component, having first and second branches, each one comprising an interior face and an exterior face, as well as an orifice opening onto the interior and exterior faces, an arm, rigidly secured to the second component, positioned between the first and second branches of the clevis and comprising an orifice, a cylindrical shaft, configured to be housed in the orifices of the first and second branches and of the arm, forming a pivot axis and having a peripheral surface and first and second end faces, According to the invention, the pivoting connection device comprises a guide ring, positioned in the orifice of the first branch, said guide ring having a tubular body extending between first and second ends and having an outside diameter substantially equal to that of the orifice of the first branch and an inside diameter substantially equal to the diameter of the cylindrical shaft, together with a flange, connected to the first end of the tubular body, pressing against the interior face of the first branch in operation; the cylindrical shaft comprises a first end stop, which is configured to collaborate in operation with the flange of the guide ring and prevent translational movement of the cylindrical shaft in a longitudinal direction in a first sense of that direction and a second end stop configured to collaborate in operation with the exterior face of the first branch and prevent translational movement of the cylindrical shaft in the longitudinal direction in a second sense of the direction that is the opposite to the first sense, the guide ring comprising a first longitudinal groove or slot configured to allow the first end stop to pass; and the pivoting connection device comprises an immobilizing system configured to immobilize the cylindrical shaft in terms of rotation with respect to the guide ring in a position in which the first end stop is offset from the first longitudinal slot.

The pivoting connection device of the invention can be mounted from just one side of the clevis and introduces no radial stress into the first and second branches of the clevis.

According to another feature, the pivoting connection device comprises a washer pushed onto the cylindrical shaft and interposed between the second end stop and the exterior face of the first branch.

According to another feature, the washer has an orifice that has a diameter substantially equal to the diameter of the cylindrical shaft and a notch configured to allow the first end stop to pass.

According to another feature, the tubular body has a length substantially equal to the distance separating the interior and exterior faces of the first branch.

According to another feature, the immobilizing system comprises a hole passing through the cylindrical shaft, an extension secured to the guide ring and positioned at the level of the second end of the tubular body, a second longitudinal slot provided at the extension of the guide ring, and a pin configured to pass through the second longitudinal slot and become lodged in the hole.

According to another feature, the pivoting connection device comprises a washer pushed onto the cylindrical shaft and interposed between the second end stop and the exterior face of the first branch, said washer comprising an orifice which exhibits a diameter substantially equal to the diameter of the cylindrical shaft and a cutout configured to allow the extension to pass.

According to another feature, the cutout and the extension have shapes that collaborate in such a way as to immobilize the washer with respect to the guide ring in terms of rotation.

According to another feature, the first and second end stops are positioned approximately on the one same generatrix of the cylindrical shaft, the second end stop having a second cross section in a transverse plane which is greater than a first cross section in a transverse plane of the first end stop.

According to another feature, the cylindrical shaft comprises at least one shape configured so that it can be rotationally driven.

Another subject of the invention is an aircraft comprising a cowl connected to a frame of an opening by at least one pivoting connection device according to one of the preceding features.

BRIEF DESCRIPTION OF THE DRAWINGS

Further features and advantages will become apparent from the following description of the invention, which description is given purely by way of example, with reference to the attached drawings in which.

DETAILED DESCRIPTION OF THE PREFERRED EMBODIMENTS

Figure 1:
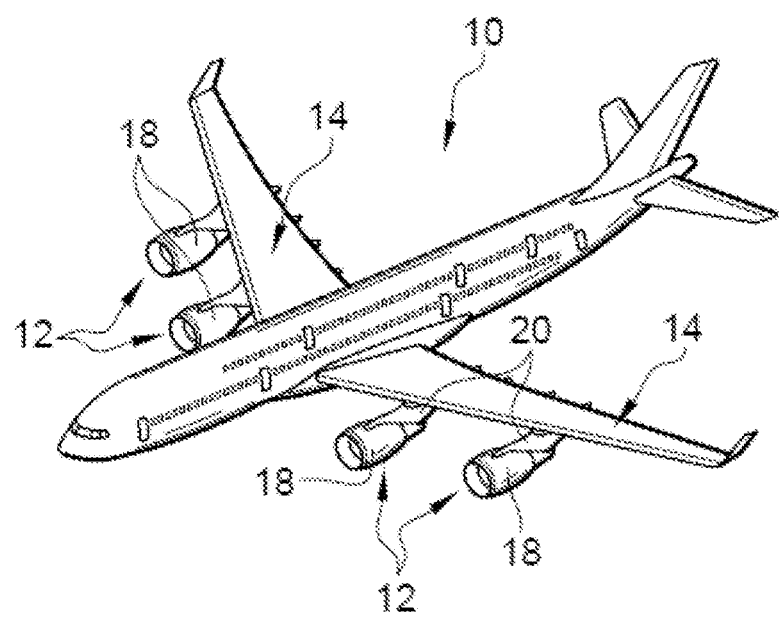
FIG. 1 is a perspective view of an aircraft.
Figure 2:
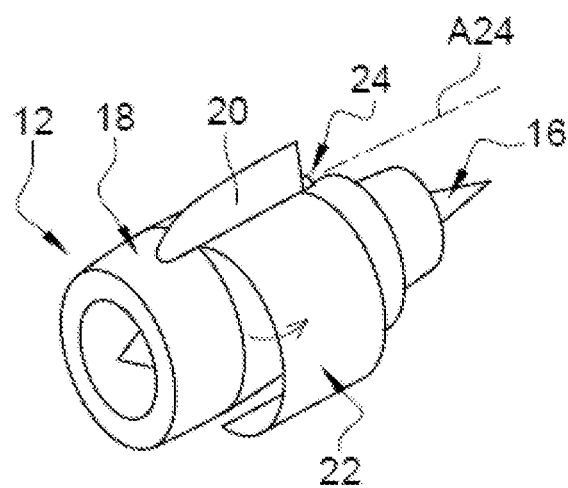
FIG. 2 is a perspective view of an engine assembly of an aircraft.
Figure 3:
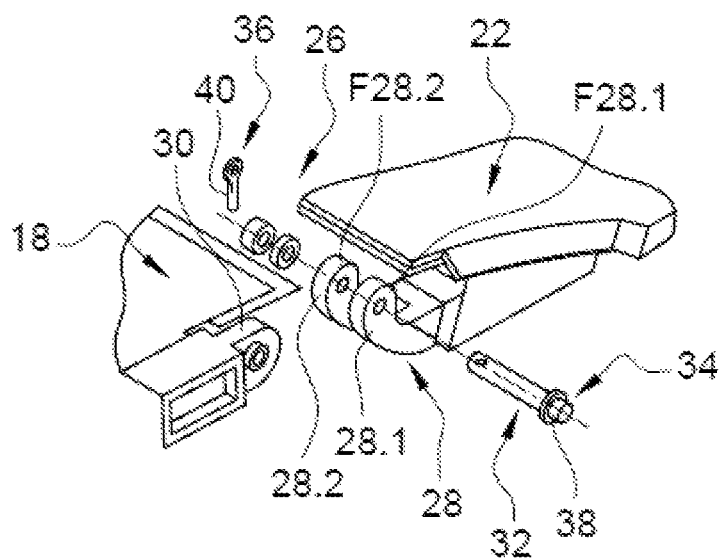
FIG. 3 is a perspective view of a pivoting connection device illustrating a first embodiment of the prior art, in the dismantled state.
Figure 4:
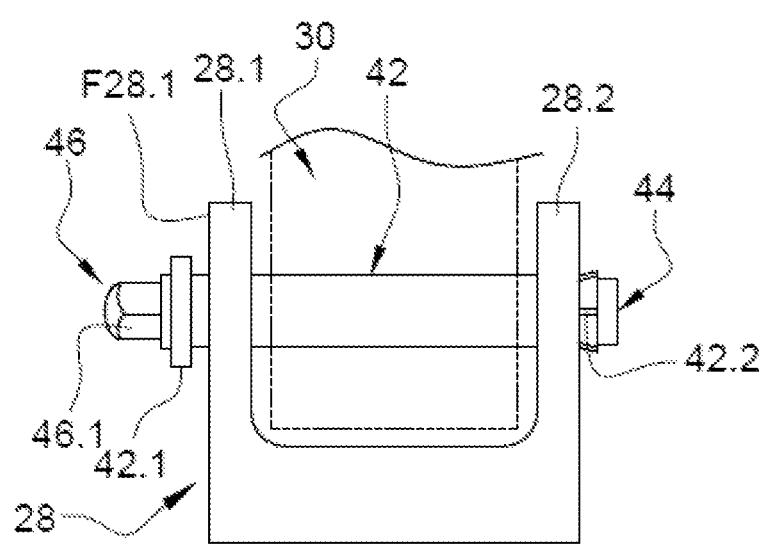
FIG. 4 is a lateral view of a pivoting connection device illustrating a second embodiment of the prior art.
Figure 5:
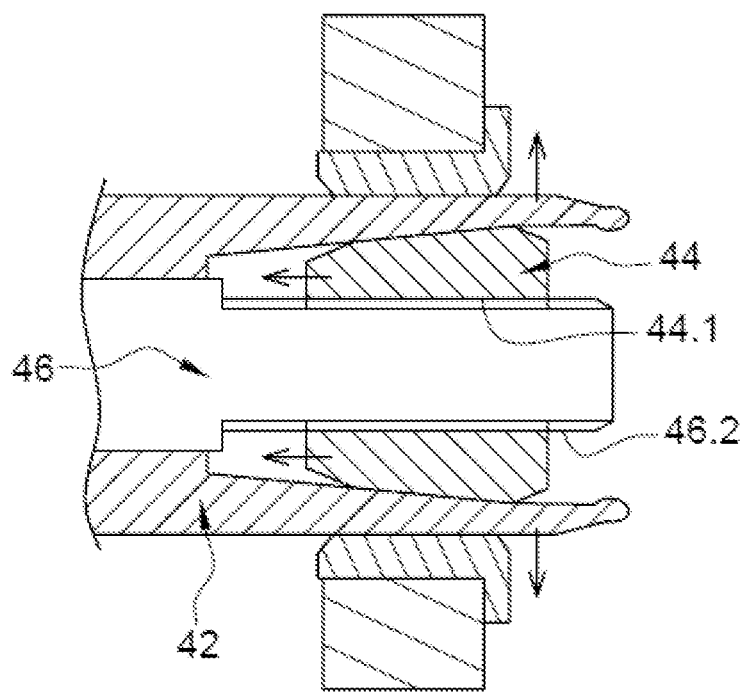
FIG. 5 is a longitudinal section through part of the pivoting connection device visible in FIG. 4.
Figure 6:
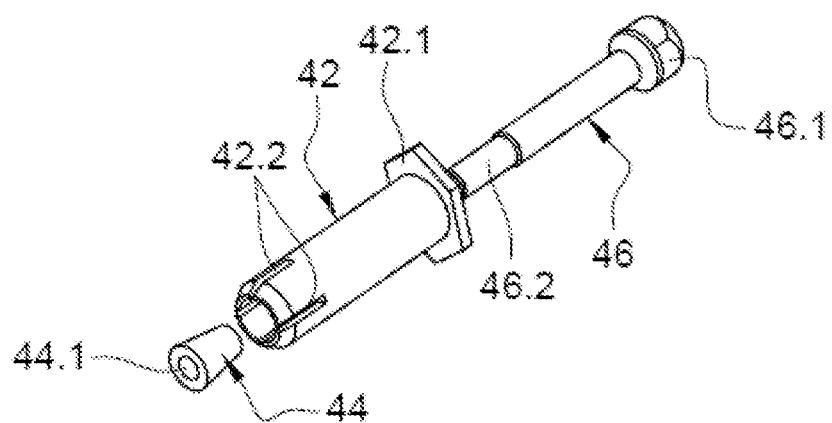
FIG. 6 is a perspective view of one part of the pivoting connection device visible in FIG. 4, in the dismantled state.
Figure 7:
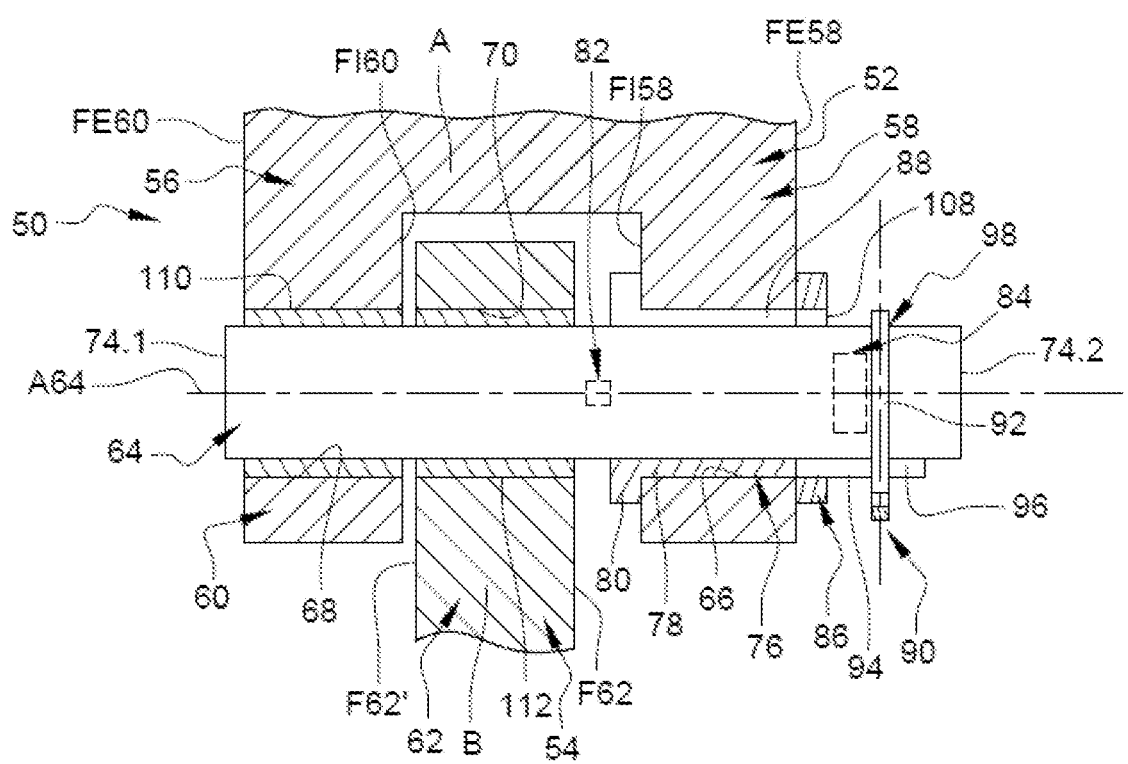
FIG. 7 is a longitudinal section through a pivoting connection device illustrating one embodiment of the invention.
Figure 8:
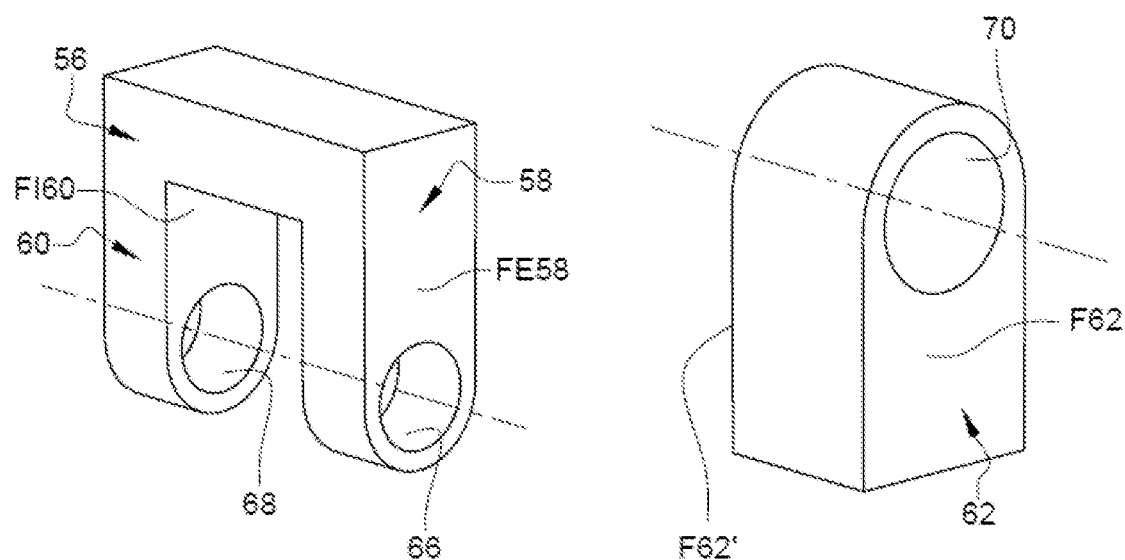
FIG. 8 is a perspective view of a clevis and of an arm of the pivoting connection device visible in FIG. 7.

FIG. 7 depicts a pivoting connection device 50 connecting at least first and second parts 52 and 54. According to one application, the first part 52 is connected to a first component A or is a part of a first component A, such as, for example, a frame of an opening of an aircraft nacelle, and the second part 54 is connected to a second component B or is part of a second component B, such as a cowl for example. According to one configuration, a cowl is connected to a frame of an opening by at least one pivoting connection device 50 that allows the cowl to pivot with respect to the frame of the opening between a closed position in which it closes off the opening of the nacelle and an open position in which it uncovers the opening of the nacelle.

The pivoting connection device 50 comprises:
- a clevis 56, rigidly secured to the first component 52, having first and second branches 58, 60,
- an arm 62, rigidly secured to the rest of the second component 54, positioned between the first and second branches 58, 60 of the clevis 56,
- a cylindrical shaft 64 connecting the arm 62 and the clevis 56 and forming a pivot axis A64.

For the remainder of the description, a longitudinal direction is a direction parallel to the pivot axis A64. A radial direction is perpendicular to the pivot axis A64. A longitudinal plane is a plane which passes through the pivot axis A64. A transverse plane is a plane perpendicular to the pivot axis A64.

According to one configuration, each branch 58 (or 60) comprises an interior face FI58 (or FI60), facing towards the other branch 60 (or 58) and an exterior face FE58 (or FE60) on the opposite side to the interior face FI58 (or F60). The interior faces FI58, FI60 and the exterior faces FE58, FE60 are mutually parallel and are positioned in transverse planes.

Each branch 58 (or 60) comprises an orifice 66 (or 68) which opens onto the interior face FI58 (or FI60) and the exterior face FE58 (or FE60). In one configuration, each orifice 66, 68 is cylindrical and has an axis of revolution perpendicular to the interior face FI58 (or FI60) and the exterior face FE58 (or FE60).

The arm 62 comprises two lateral faces F62, F62', parallel to one another and perpendicular to the pivot axis A64, and an orifice 70 which opens onto the lateral faces F62, F62'. In one configuration, the orifice 70 is cylindrical and has an axis of revolution, perpendicular to the lateral faces F62, F62', which corresponds to the pivot axis A64.

The cylindrical shaft 64 has a cylindrical peripheral surface 72 coaxial with the pivot axis A64, and which extends between first and second end faces 74.1, 74.2 which are substantially perpendicular to the pivot axis A64.

The orifice 66 of the first branch 58 has a diameter greater than the diameter of the cylindrical shaft 64.

The pivoting connection device 50 comprises a guide ring 76, positioned in the orifice 66, which has a tubular body 78 having an outside diameter substantially equal to that of the orifice 66 of the first branch 58 and an inside diameter substantially equal to the diameter of the cylindrical shaft 64 and which extends between first and second ends 78.1, 78.2, as well as a flange 80, connected to the first end 78.1 of the tubular body 78 and positioned, in operation, facing the interior face FI58 of the first branch 58 and configured to bear against same.

The tubular body 78 has a length (dimension considered between its first and second ends 78.1, 78.2) substantially equal to the distance separating the interior and exterior faces FI58, FE58 of the first branch 58 of the clevis 56.

The cylindrical shaft 64 comprises a first end stop 82, having a first cross section in a transverse plane, for example in the shape of an inverted U, having a first height H1 (dimension considered in a radial direction) and a first width L1 (dimension considered in a direction perpendicular to the radial direction). This first end stop 82 is configured to collaborate in operation with the flange 80 of the guide ring 76 and prevent translational movement of the cylindrical shaft 64 in a first sense of the longitudinal direction.

The cylindrical shaft 64 also comprises a second end stop 84, having a second cross section in a transverse plane, for example in the shape of an inverted U, which is larger than that of the first end stop 82, having a second height H2 greater than the first height H1 of the first end stop 82 and/or a second width L2 greater than the first width L1 of the first end stop 82. This second end stop 84 is configured to collaborate in operation with the exterior face FE58 of the first branch 58 and prevent a translational movement of the cylindrical shaft 64 in the second sense of the longitudinal direction which is the opposite sense to the first sense. The second end stop 84 may bear against the exterior face FE58 of the first branch 58 directly or via a washer 86.

In one configuration, the first and second end stops 82, 84 are positioned approximately on the one same generatrix of the cylindrical shaft 64.

The first and second end stops 82, 84 are separated by a distance D1 substantially equal to the length L76 of the guide ring 76, which corresponds to the thickness of the flange 80 and to the length of the tubular body 78 (dimension considered in the longitudinal direction) increased by the thickness of the washer 86, if there is one.

In order to allow the cylindrical shaft 64 to be fitted, the guide ring 76 comprises a first longitudinal slot 88 which extends along its entire length, configured to allow the first end stop 82 to pass. In one configuration, the first longitudinal slot 88 has a width substantially equal to or very slightly greater than the first width L1 of the first end stop 82. According to another configuration which is suitable if the height H1 of the first end stop 82 is less than the thickness of the tubular body 78 of the guide ring 76, the first longitudinal slot 88 could be replaced by a first longitudinal groove opening onto the interior surface of the guide ring 76 and configured to allow the first end stop 82 to pass.

The pivoting connection device 50 comprises an immobilizing system 90 configured to immobilize the cylindrical shaft 64 in terms of rotation with respect to the guide ring 76 in a position in which the first end stop 82 is offset from the first longitudinal slot 88 in operation.

According to one embodiment, the immobilizing system 90 comprises a hole 92 passing through the cylindrical shaft 64, an extension 94, rigidly secured to the guide ring 76, positioned at the second end 78.2 of the tubular body 78 and a second longitudinal slot 96 provided at the extension 94 of the guide ring 76 and a pin 98 configured to pass through the second longitudinal slot 96 and become lodged in the hole 92. When the cylindrical shaft 64 is correctly positioned, the extension 94 projects from the exterior face FE58 of the first branch 58. In one configuration, the first longitudinal slot 88 and the extension 94 are diametrically opposed.

Figure 9:
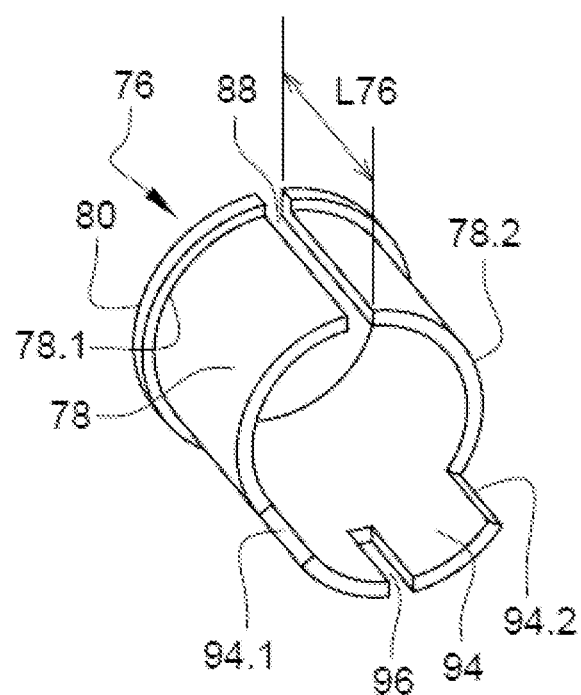
FIG. 9 is a perspective view of a guide ring of the pivoting connection device visible in FIG. 7.
Figure 10:
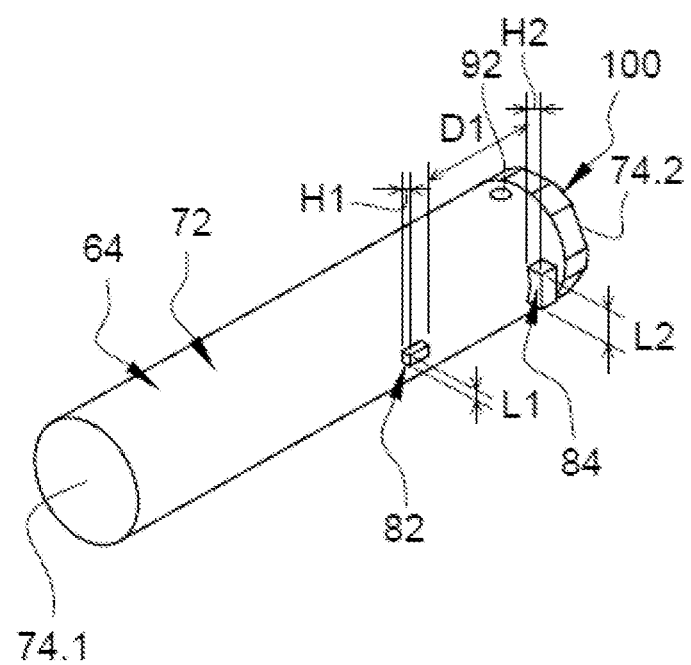
FIG. 10 is a perspective view of a cylindrical shaft of the pivoting connection device visible in FIG. 7.

According to one embodiment visible in FIG. 9, the extension 94 has an inside radius equal to the inside diameter of the tubular body 78 and an outside radius equal to the outside diameter of the tubular body 78. The extension 94 is delimited by first and second edge faces 94.1, 94.2 positioned in longitudinal planes. In one configuration, the extension 94 extends over an angular sector of the order of 90° (the angle formed between the first and second edge faces 94.1, 94.2).

Of course, the invention is not restricted to this angle or to this shape for the extension 94. Likewise, the second longitudinal slot 96 could be replaced by an orifice or a slit oriented in the longitudinal direction.

The hole 92 has a cross section substantially equal to, or very slightly greater than, that of the pin 98. This hole 92 extends along a diameter of the cylindrical shaft 64. The second longitudinal slot 96 has a width substantially equal to or very slightly greater than the cross section of the pin 98. The hole 92 and the second longitudinal slot 96 are positioned in such a way that the first end stop 82 is offset with respect to the first longitudinal slot 88 when the cylindrical shaft 64 is immobilized in terms of rotation with respect to the guide ring 76 by the pin 98.

In one configuration, the first and second longitudinal slots 88, 96 are diametrically opposed and the open-ended orifices of the hole 92 are angularly offset with respect to the first end stop 82 by an angle of around 90° for example.

Figure 17:
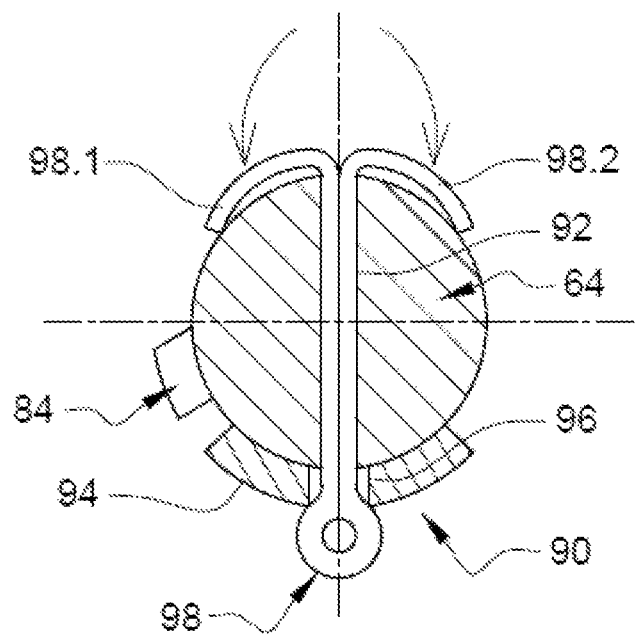
FIG. 17 is a cross section of a cylindrical shaft of a pivoting connection device after the fitting of a pin.

According to one embodiment, the pin 98 is a split pin. According to one configuration, it is introduced via the second longitudinal slot 96 and has two branches 98.1, 98.2 the ends of which are bent over, as illustrated in FIG. 17, so as to prevent the pin 98 from being withdrawn from the hole 92.

When the cylindrical shaft 64 is immobilized in terms of rotation with respect to the guide ring 76 so that the first end stop 82 is offset with respect to the first slot 88 in the guide ring 76, the cylindrical shaft 64 is immobilized in terms of translational movement with respect to the first branch 58, the first end stop 82 bearing against the flange 80 of the guide ring 76, itself bearing against the interior face FI58 of the first branch 58, the second end stop 84 bearing directly against the exterior face FE58 of the first branch 58 or bearing against the washer 86 which is itself bearing against the exterior face FE58 of the first branch 58.

The first and second end stops 82, 84 are positioned in such a way that the first end face 74.1 of the cylindrical shaft 64 is positioned in the plane of the exterior face FE60 of the second branch 60 of the clevis 56 or very slightly proud thereof.

The cylindrical shaft 64 has at least one shape 100 configured for turning it. According to one embodiment, the peripheral surface 72 of the cylindrical shaft 64 comprises an end portion 102 adjacent to the second end face 74.2 which has a cross section that is non-cylindrical, for example square, hexagonal, octagonal or the like.

According to one embodiment, the pivoting connection device 50 comprises a washer 86 which has an orifice 104 to allow the cylindrical shaft 64 and the extension 94 to pass, said washer 86 being configured to be interposed between the second end stop 84 and the exterior face FE58 of the first branch 58. This washer 86 ensures better distribution of the stresses over the entire periphery of the orifice 66 of the first branch 58.

Figure 12:
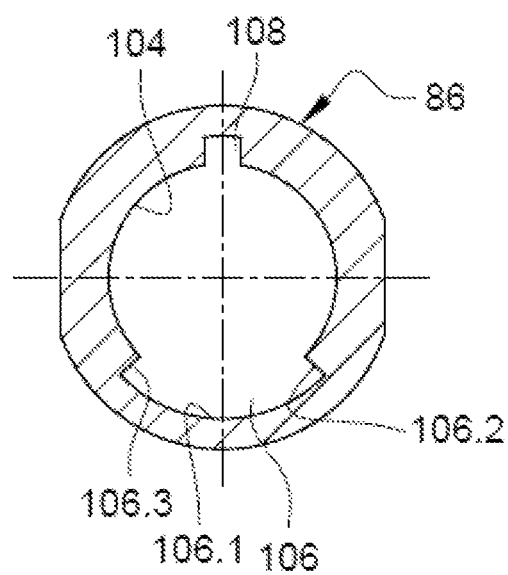
FIG. 12 is a view in cross section of a washer pushed onto the cylindrical shaft visible in FIG. 10.

According to one configuration illustrated in FIG. 12, the orifice 104 has a diameter substantially equal to that of the cylindrical shaft 64. The washer 86 comprises a cutout 106 configured to allow the extension 94 to pass. The cutout 106 and the extension 94 have shapes which collaborate in such a way as to immobilize the washer 86 in terms of rotation with respect to the guide ring 76. According to one configuration, the cutout 106 comprises a first edge 106.1 in the shape of an arc of a circle which has a radius equal to the outside radius of the extension 94, second and third edges 106.2, 106.3 connecting the first edge 106.1 and the orifice 104 and which are configured to collaborate with the first and second edge faces 94.1, 94.2 of the extension 94. The second and third edges 106.2, 106.3 form an angle substantially equal to that of the first and second edge faces 94.1, 94.2 of the extension 94. In operation, the extension 94 is inserted into the cutout 106 and the washer 86 is immobilized in terms of rotation with respect to the guide ring 76.

The washer 86 comprises a notch 108 configured to allow the first end stop 82 to pass and to block the passage of the second end stop 84. According to one configuration, the notch 108 has a cross section substantially equal to or very slightly greater than that of the first end stop 82 and smaller than that of the second end stop 84. The notch 108 is diametrically opposite the cutout 106.

Depending on circumstances, the orifice 68 of the second branch 60 of the clevis 56 may have a diameter equal to that of the cylindrical shaft 64 or greater so as to interpose a second guide ring 110 between the cylindrical shaft 64 and the second branch 60.

The orifice 70 of the arm 62 may have a diameter equal to that of the cylindrical shaft 64 or larger so as to interpose a third guide ring 112 between the cylindrical shaft 64 and the arm 62.

The assembling of the pivoting connection device 50 is described with reference to FIGS. 11 to 17.

Figure 11:
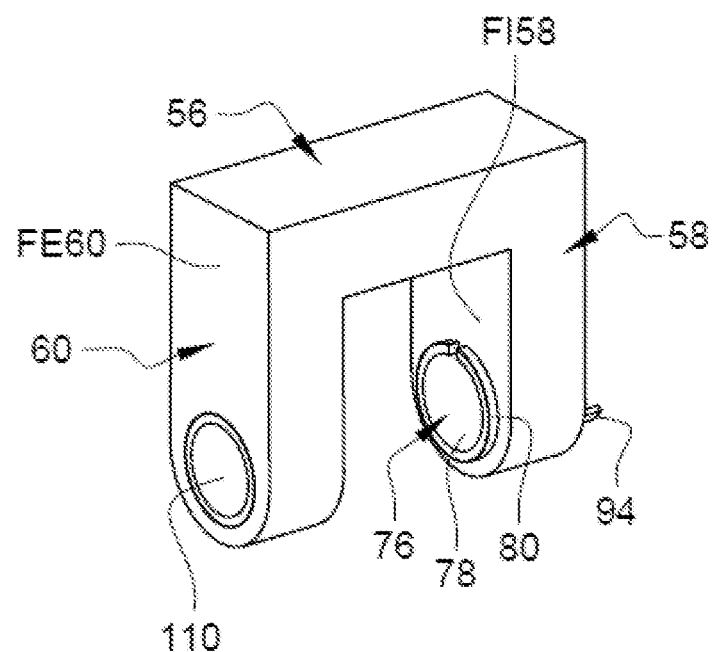
FIG. 11 is a perspective view of the clevis visible in FIG. 8 equipped with the guide ring visible in FIG. 9.

The guide ring 76 is inserted into the orifice 66 of the first branch 58 of the clevis 56, as illustrated in FIG. 11. The other guide rings 110, 112, if present, are inserted into the orifice 68 in the second branch 60 of the clevis and into the orifice 70 of the arm 62.

As illustrated in FIG. 12, the washer 86 is pushed onto the cylindrical shaft 64 from the first end face 74.1 until it comes into contact with the second end stop 84, the first end stop 82 having passed through the notch 108 in the washer 86.

Figure 13:
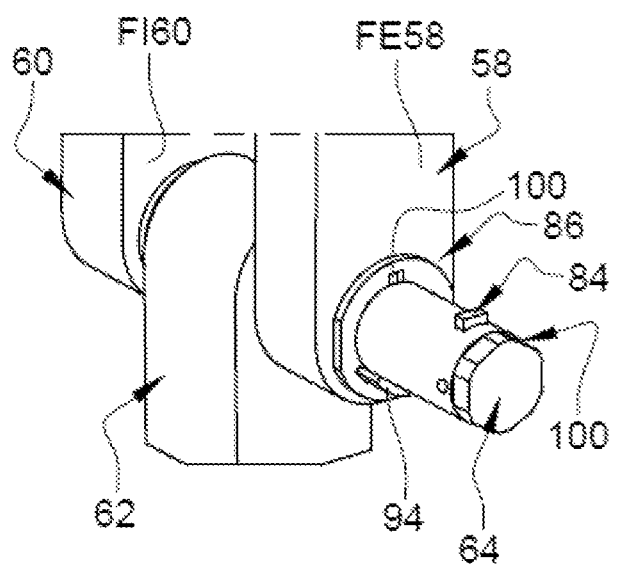
FIG. 13 is a perspective view of a cylindrical shaft inserted into a clevis and an arm.

The cylindrical shaft 64 is introduced into the guide ring 76 positioned in the orifice 66 of the first branch 58 of the clevis 56, then passes through the arm 62 and finally the second branch 60 of the clevis 56, as illustrated in FIG. 13. During the fitting of the cylindrical shaft 64, the first end stop 82 passes through the first longitudinal slot 88.

Figure 14:
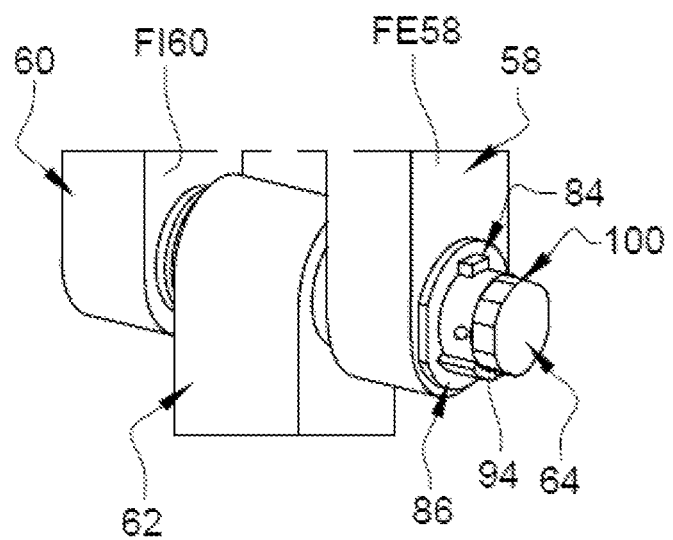
FIG. 14 is a perspective view of a cylindrical shaft equipped with a washer at the end of its insertion.

As illustrated in FIG. 14, the cylindrical shaft 64 is inserted until the second end stop 84 comes to bear against the washer 86 which is itself in abutment against the second end 78.2 of the tubular body 78 of the guide ring 76 and against the exterior face FE58 of the first branch 58. As a result, the first end stop 82 is positioned between the flange 80 of the guide ring 76, and the arm 62.

Figure 15:
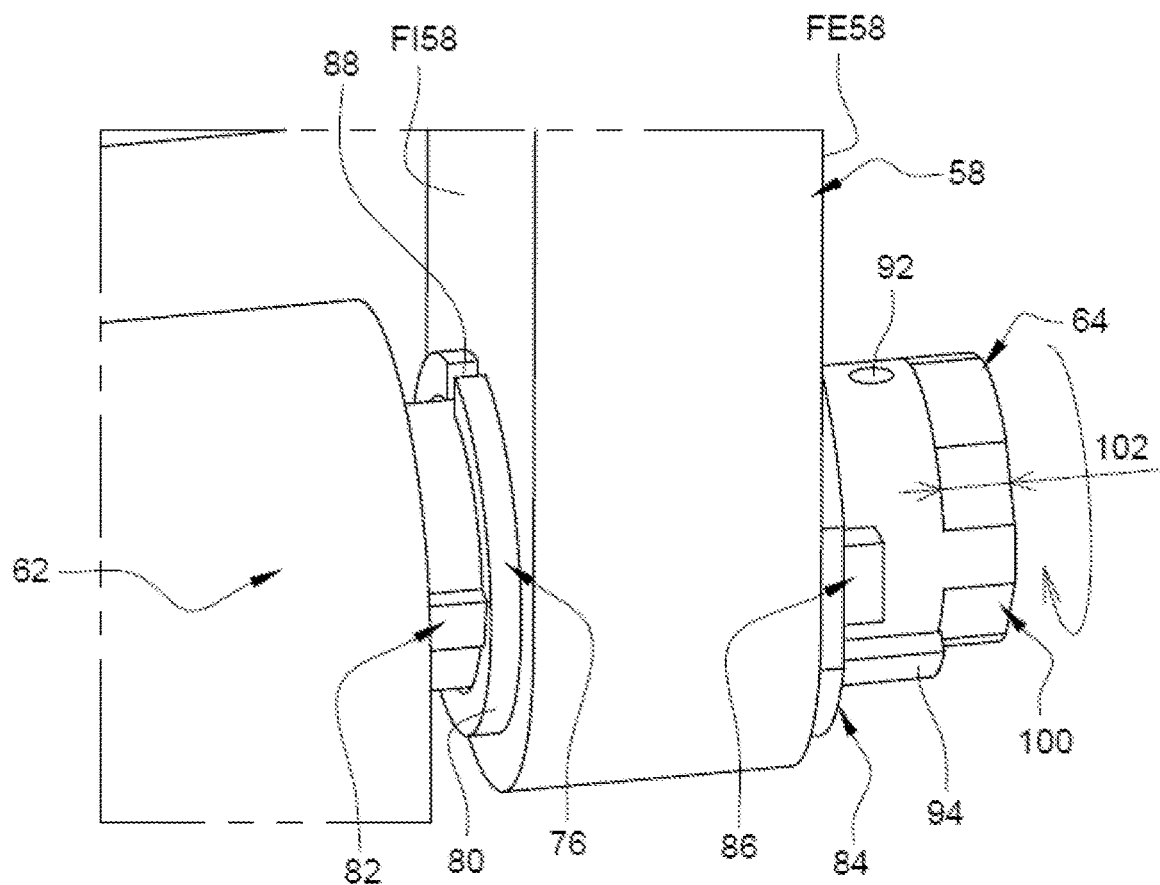
FIG. 15 is a perspective view of part of a pivoting connection device after a pivoting of the cylindrical shaft.
Figure 16:
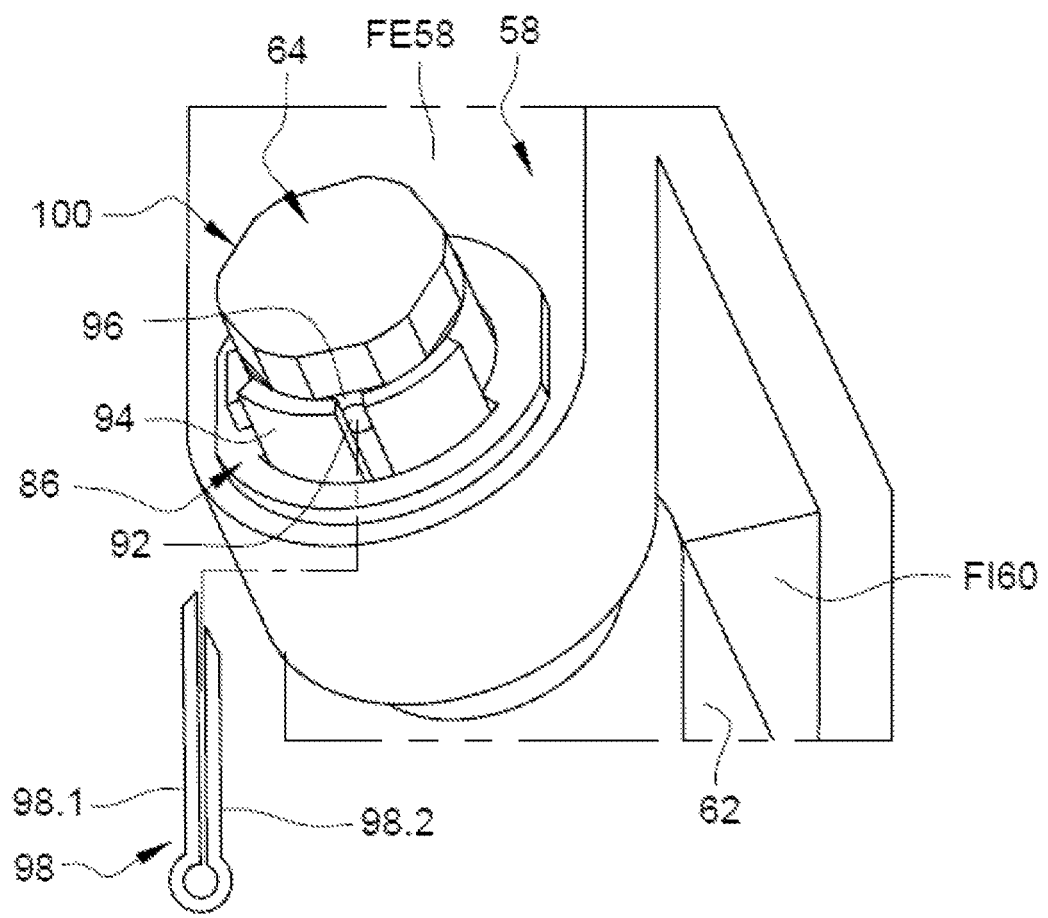
FIG. 16 is a perspective view of part of a pivoting connection device before a pin is fitted.

The cylindrical shaft 64 is then pivoted, as illustrated in FIG. 15, so as to offset the first end stop 82 with respect to the first longitudinal slot 88 until such a point as the hole 92 of the cylindrical shaft 64 is aligned with the second longitudinal slot 96 of the guide ring 76, as illustrated in FIG. 16.

The pin 98 is then inserted into the hole 92, passing through the second longitudinal slot 96, and the ends of its branches 98.1, 98.2 are then bent over, as illustrated in FIG. 17.

The pivoting connection device 50 may be fitted from just one side of the clevis 56. Moreover, it does not introduce any radial stress into the first and second branches of the clevis 56.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pivoting connection device connecting at least two components and comprising:

a clevis, rigidly attached to a first of the at least two components, having first and second branches, each one comprising an interior face and an exterior face, as well as an orifice opening onto the interior and exterior faces, an arm, rigidly secured to a second of the at least two components, positioned between the first and second branches of the clevis and comprising an orifice, a cylindrical shaft, configured to be housed in the orifices of the first and second branches and of the arm, forming a pivot axis and having a peripheral surface and first and second end faces, wherein the pivoting connection device comprises a guide ring, positioned in the orifice of the first branch, said guide ring having a tubular body extending between first and second ends and having an outside diameter substantially equal to that of the orifice of the first branch and an inside diameter substantially equal to the diameter of the cylindrical shaft, together with a flange, connected to the first end of the tubular body, pressing against the interior face of the first branch in operation, wherein the cylindrical shaft comprises a first end stop, which is configured to collaborate in operation with the flange of the guide ring and prevent translational movement of the cylindrical shaft in a longitudinal direction in a first sense of that direction and a second end stop configured to collaborate in operation with the exterior face of the first branch and prevent translational movement of the cylindrical shaft in the longitudinal direction in a second sense of a direction that is opposite to the first sense, the guide ring comprising a first longitudinal groove or slot configured to allow the first end stop to pass, and wherein the pivoting connection device comprises an immobilizing system configured to immobilize the cylindrical shaft in terms of rotation with respect to the guide ring in a position in which the first end stop is offset from the first longitudinal slot.

2. The pivoting connection device according to claim 1, further comprising a washer pushed onto the cylindrical shaft and interposed between the second end stop and the exterior face of the first branch.

3. The pivoting connection device according to claim 2, wherein the washer has an orifice that has a diameter substantially equal to the diameter of the cylindrical shaft and a notch configured to allow the first end stop to pass.

4. The pivoting connection device according to claim 1, wherein the tubular body has a length substantially equal to a distance separating the interior and exterior faces of the first branch.

5. The pivoting connection device according to claim 1, wherein the immobilizing system comprises
a hole passing through the cylindrical shaft, an extension secured to the guide ring and positioned at a level of the second end of the tubular body,
a second longitudinal slot provided at the extension of the guide ring, and
a pin configured to pass through the second longitudinal slot and become lodged in the hole.

6. The pivoting connection device according to the claim 5, further comprising
a washer pushed onto the cylindrical shaft and interposed between the second end stop and the exterior face of the first branch,
said washer comprising an orifice which exhibits a diameter substantially equal to the diameter of the cylindrical shaft and a cutout configured to allow the extension to pass.

7. The pivoting connection device according to claim 6, wherein the cutout and the extension have shapes that collaborate such as to immobilize the washer with respect to the guide ring in terms of rotation.

8. The pivoting connection device according to claim 1, wherein the first and second end stops are positioned approximately on the one same generatrix of the cylindrical shaft, the second end stop having a second cross section in a transverse plane which is greater than a first cross section in a transverse plane of the first end stop.

9. The pivoting connection device according to claim 1, wherein the cylindrical shaft comprises at least one shape configured so that the cylindrical shaft can be rotationally driven.

10. An aircraft comprising a cowl connected to a frame of an opening by at least one pivoting connection device according to claim 1.

* * * * *